(12) United States Patent
Edwards et al.

(10) Patent No.: US 8,664,816 B1
(45) Date of Patent: Mar. 4, 2014

(54) MAGNETIC REACTION APPARATUS, ASSEMBLY AND ASSOCIATED METHODS FOR OPTIMIZATION OF A CYCLIC DRIVE INPUT

(71) Applicants: John W. Edwards, Arcadia, FL (US); Robert M. Herrin, Orlando, FL (US); Johnny M. Tharpe, Jr., Albany, GA (US)

(72) Inventors: John W. Edwards, Arcadia, FL (US); Robert M. Herrin, Orlando, FL (US); Johnny M. Tharpe, Jr., Albany, GA (US)

(73) Assignee: Magnamotor, LLC, Tampa, FL (US)

( * ) Notice: Subject to any disclaimer, the term of this patent is extended or adjusted under 35 U.S.C. 154(b) by 0 days.

(21) Appl. No.: 13/838,412

(22) Filed: Mar. 15, 2013

Related U.S. Application Data (63) Continuation-in-part of application No. 13/081,595, filed on Apr. 7, 2011, now Pat. No. 8,508,089.

(60) Provisional application No. 61/416,405, filed on Nov. 23, 2010, provisional application No. 61/378,984, filed on Sep. 1, 2010.

(51) Int. Cl.
*H02K 7/06* (2006.01)
(52) U.S. Cl.
USPC ............................... 310/80; 310/37; 310/152
(58) Field of Classification Search
USPC ............................................. 310/37, 80, 152
See application file for complete search history.

(56) References Cited

U.S. PATENT DOCUMENTS

| | | | |
|---|---|---|---|
| 2,790,095 | A | 4/1957 | Peek et al. |
| 3,675,506 | A | 7/1972 | Leone |
| 3,703,653 | A | 11/1972 | Tracy et al. |
| 3,899,703 | A | 8/1975 | Kinnison |
| 3,967,146 | A | 6/1976 | Howard |
| 4,011,477 | A | 3/1977 | Scholin |
| 4,038,572 | A | 7/1977 | Hanagan |
| 4,207,773 | A | 6/1980 | Stahovic |
| 4,387,793 | A | 6/1983 | Sugano |
| 4,924,123 | A | 5/1990 | Hamajima et al. |
| 5,055,727 | A | 10/1991 | Kenderdine |
| 5,105,113 | A | 4/1992 | Ishikura et al. |
| 5,219,034 | A | 6/1993 | Wortham |

(Continued)

FOREIGN PATENT DOCUMENTS

| | | |
|---|---|---|
| JP | 7274481 | 10/1995 |
| JP | 2001-346375 | 12/2001 |

(Continued)

OTHER PUBLICATIONS

International Searching Authority, PCT Notification of Transmittal of International Search Report and Written Opinion mailed Mar. 27, 2012; entire document.

*Primary Examiner* — Nguyen N Hanh
(74) *Attorney, Agent, or Firm* — Allen, Dyer, Doppelt, Milbrath & Gilchrist, P.A.

(57) ABSTRACT

A permanent magnet is rotated about an axis extending between opposing north and south poles. The magnetic field of the rotated permanent magnet interacts with magnetic fields of permanent magnets carried by a shuttle for repelling and attracting the fixed permanent magnets, and providing a linear reciprocating movement of the shuttle responsive to the favorable rotary motion of the rotated permanent magnet where the force of the linear motion is captured by an energy storage device.

30 Claims, 6 Drawing Sheets

(56) References Cited

U.S. PATENT DOCUMENTS

| | | | |
|---|---|---|---|
| 5,415,140 A | 5/1995 | Rigazzi | |
| 6,274,959 B1 | 8/2001 | Uchiyama | |
| 6,700,248 B2 | 3/2004 | Long | |
| 8,508,089 B2 * | 8/2013 | Edwards et al. | 310/80 |
| 2007/0120432 A1 * | 5/2007 | Vaden et al. | 310/80 |
| 2007/0278800 A1 | 12/2007 | Galich | |
| 2008/0277939 A1 | 11/2008 | Richardson et al. | |
| 2009/0218899 A1 * | 9/2009 | Carey | 310/152 |

FOREIGN PATENT DOCUMENTS

| | | |
|---|---|---|
| JP | 2002-027734 | 1/2002 |
| WO | 00/14410 | 3/2000 |
| WO | 01/77522 | 10/2001 |

* cited by examiner

MAGNETIC REACTION APPARATUS, ASSEMBLY AND ASSOCIATED METHODS FOR OPTIMIZATION OF A CYCLIC DRIVE INPUT

CROSS-REFERENCE TO RELATED APPLICATIONS

This application is a continuation-in-part of application Ser. No. 13/081,595, filed Apr. 7, 2011, and claims the benefit of U.S. Provisional Application Nos. 61/378,984 filed Sep. 1, 2010 for Magnetic Drive Motor Assembly and Method, and 61/416,405 filed Nov. 23, 2010 for Magnetic Drive Motor Assembly and Associated Methods, the disclosures of which are hereby incorporated by reference herein in their entireties, and all commonly owned.

FIELD OF THE INVENTION

The present invention generally relates to apparatus, assembly, and methods employing magnetic fields to provide a driving force, and more particularly to a method of using permanent magnets for enhancing power from a cyclic drive input.

BACKGROUND OF THE INVENTION

The use of a magnetic field to provide a driving force is well known. Reducing available sources of standard types of fuel and concerns for protecting the environment have led to increased efforts in developing alternative sources for supplying energy to drive power systems. One type of power system which eliminates the need for fuel and also eliminates the ecological drawbacks of fuel consumption is a system which utilizes magnetic motors. As described in U.S. Pat. No. 4,038,572 to Hanagan, it is desirable to have a prime mover which would not depend exclusively upon fossil fuels. The benefits of alternate forms of prime movers adapted to be utilized in motor vehicles, and the like, is well known in the art. The desirability of developing a prime mover for motor vehicles which would not be dependent on fossil fuels for its source of energy has received a great deal of impetus. In response, Hanagan provides a magnetic clutch device described as a magnetically driven motor.

U.S. Pat. No. 3,899,703 to Kinnison for a Permanent Magnet Motion Conversion Means discloses a magnetic motor using stationary magnets arranged with inverse polarity and another permanent magnet alternately movable within the field of the stationary magnets by a diverter, such as a solenoid, to convert a rotational movement to a linear movement.

Indeed, several types of magnetic motors are known in which a rotating set of magnets is influenced by attractive and repulsive forces created by opposing magnets. U.S. Pat. No. 4,207,773 to Stahovic discloses arcuate shaped permanent magnets affixed to a moveable member on opposing sides of a rotatable magnet such that rotation of the rotatable magnet causes an alternating linear movement of the moveable member. U.S. Pat. No. 4,011,477 to Scholin discloses an apparatus for converting variations in magnetic force between magnets, one rotating and one non-rotating, into a reciprocating linear motion, the disclosure of which is incorporated by reference. U.S. Pat. No. 3,703,653 to Tracy et al discloses a set of magnets mounted for rotation about an axis first attracted towards the corresponding stationary magnets. After the rotatable magnets are aligned with the stationary magnets, the magnetic fields of the stationary magnets are then altered so as to provide a repulsion force with respect to the rotatable magnets thereby causing the continued rotation of the rotatable magnets. In order to accomplish this effective inversion of the polarity of the stationary magnets, so as to alternately provide the attractive and repulsive forces, the stationary magnets are initially covered by magnetic plates as the rotatable magnets are approaching the position of the stationary magnets. These magnetic plates in effect cause the stationary magnets to provide attractive forces to the rotatable magnets. When the rotatable magnets are then in alignment with the stationary magnets, these magnetic plates are removed and the stationary magnets then provide a repulsion force to the rotatable magnets and thereby cause the continued movement of the rotatable magnets.

Yet further, rotary generators are well known and used to generate electric energy by movement of magnets within inductive coils. Typically, the rotary generator has a plurality of inductive coils, a plurality of magnets inserted into the respective inductive coils and rotatable within the inductive coils, a mechanical assembly of magnets, and a motor generating and applying a movable force to the magnets through the mechanical assembly.

Attempts continue to provide magnetic motors which can be economically and efficiently operated for providing power. With such extensive use of magnetic fields to do work, there remains a need to provide an efficient means for enhancing operation of well-known machines using available magnetic forces for improving efficiency of power sources and enhancing power output from devices such as motors.

SUMMARY OF THE INVENTION

The invention employs a rotatable permanent magnet having a north pole and an opposing south pole favorably rotatable about an axis and between the opposing poles. A shuttle confined to a linear movement generally parallel to the axis may include first and second fixed permanent magnets affixed to the shuttle, wherein the rotatable permanent magnet is carried there between. Each of the first and second fixed permanent magnets has a north pole and an opposing south pole with the axis extending there between. The permanent magnets are positioned such that rotation of the rotatable permanent magnet results in repelling and attracting of the first and second fixed permanent magnets, alternately, and thus a linear reciprocating movement of the shuttle is induced. This invention includes: a favorable rotation method achieving a reduced rotation torque; a progressively variable with angular position linear-to-rotational force converter; an energy storage device for capturing the cyclic energy impulse generated by the magnetic reaction; a novel method for increasing the output force of the linear magnetic reaction by focusing the magnetic flux field of the permanent magnets; and methods for harvesting the energy of the linear motion.

These aspects of the invention, along with other additional aspects, embodiments, and features will be better understood by referring to the accompanying drawings and the Detailed Description of the Preferred Embodiments.

DETAILED DESCRIPTION OF THE PREFERRED EMBODIMENTS

In the Summary above and in the Detailed Description of Preferred Embodiments, reference is made to particular features (including method steps) of the invention. Where a particular feature is disclosed in the context of a particular aspect or embodiment of the invention, that feature can also be used, to the extent possible, in combination with and/or in the context of other particular aspects and embodiments of the invention, and in the invention generally.

The term "comprises" is used herein to mean that other ingredients, features, steps, etc. are optionally present. When reference is made herein to a process comprising two or more defined steps, the steps can be carried in any order or simultaneously (except where the context excludes that possibility), and the process can include one or more steps which are carried out before any of the defined steps, between two of the defined steps, or after all of the defined steps (except where the context excludes that possibility).

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
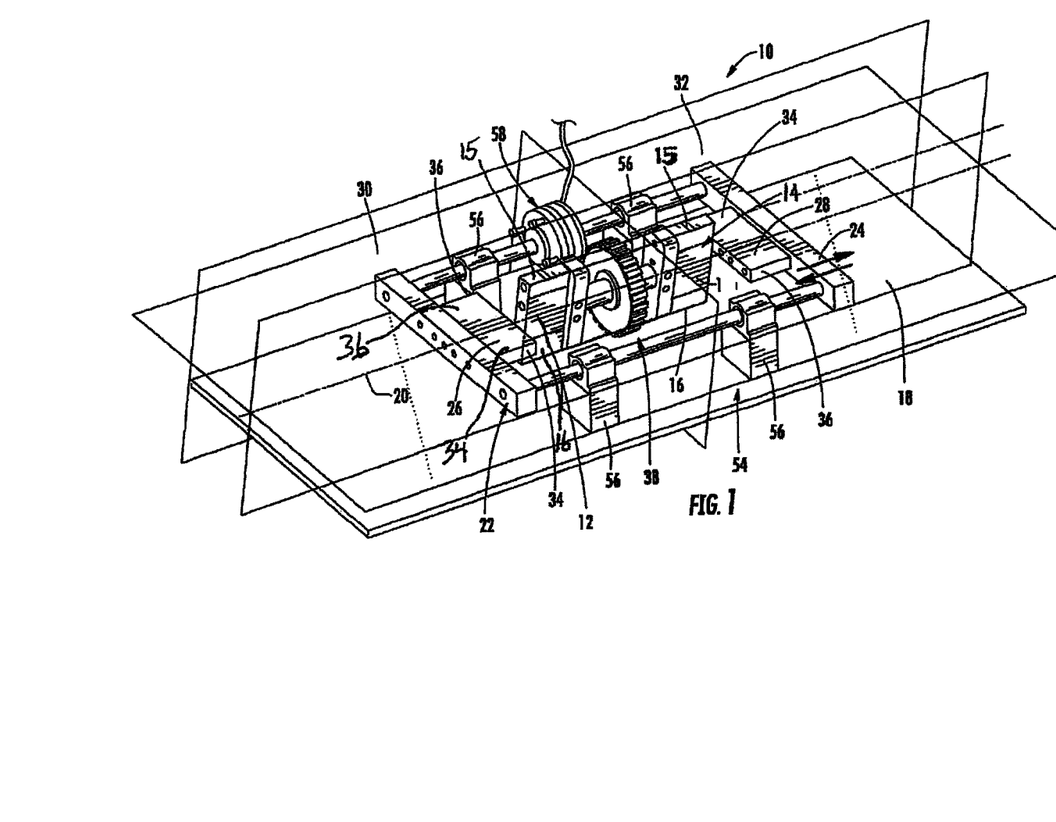
FIG. 1 is a perspective view of one embodiment of the invention.

Referring initially to FIG. 1, one embodiment in keeping with the teachings of the present invention directed to motion conversion is herein described, by way of example, as an apparatus 10 comprising rotatable permanent magnets 12, 14 each having a north pole 15 and an opposing south pole 16 aligned within a plane 18. The rotatable permanent magnets 12, 14 are rotatable about an axis 20 within the plane 18 and lying between the opposing poles 15, 16. A shuttle 22 is confined to a linear reciprocating movement 24 generally parallel to the axis 20. The rotatable permanent magnets 12, 14 are positioned between first and second fixed permanent magnets 26, 28 affixed to opposing first and second sides 30, 32 of the shuttle 22 forming a permanent magnet axis group 50. Each of the first and second fixed permanent magnets 26, 28 has a north pole 34 and an opposing south pole 36, wherein the axis 20 extends therebetween. The magnets are positioned such that rotation of the rotatable permanent magnets 12, 14 is coincident with a repelling and an attracting of the first and second fixed permanent magnets 26, 28, alternately, and the linear reciprocating movement 24 of the shuttle 22 is induced.

With continued reference to FIG. 1, while a single rotatable permanent magnet 12 may be employed, desirable improvements include at least two opposing rotatable permanent magnets 12, 14. In other embodiments, the rotating permanent magnets 12, 14 are located on the first and second sides 30, 32 of shuttle 22 operable with drive 38 for rotation thereof with a single fixed permanent magnet 26 located between rotatable permanent magnets 12, 14 or a pair of fixed permanent magnets 26, 28 located between rotatable permanent magnets 12, 14. Further, improved efficiency results when the poles 34, 36 of the first fixed permanent magnet 26 are 180 degrees out of phase with the poles 34, 36 of the second permanent magnet 28.

While those of skill in the art will appreciate that converting a direction of motion may include converting a linear motion to a rotary motion and converting a rotary motion to a linear motion, by way of example, embodiments of the invention as herein described are directed to improving efficiencies when converting a rotary motion to a linear motion. More specifically, the rotatable permanent magnet illustrated and described with reference again to FIG. 1 is operable with a drive 38 for rotation thereof in affecting a linear movement 24 of the shuttle 22 as a result of the magnetic interaction between the fixed permanent magnets 26, 28 and the rotatable permanent magnets 12, 14. With continued rotation of the rotatable magnets 12, 14 a reciprocating linear movement 24 of the shuttle 22 is created. The drive 38 input is magnetically coupled to the shuttle 22. The linear movement 24 of the shuttle 22 is a function of the shuttle load and the input rate of the drive 38. The rotating motion of the drive 38 may be continuous or cyclic. For the embodiment herein described, the drive 38 includes an electric motor not shown, but will be understood that other well known drives may be employed without departing from the teachings of the invention.

Efficiencies have been shown to increase when employing multiple permanent magnet axis groups 50. One embodiment of a multiple permanent magnet axis groups 50 is illustrated with reference to FIG. 2 for an apparatus 100 for converting cyclic rotary motion provided by the drive 38 to the reciprocating linear motion 24 of the shuttle 22.

Figure 2:
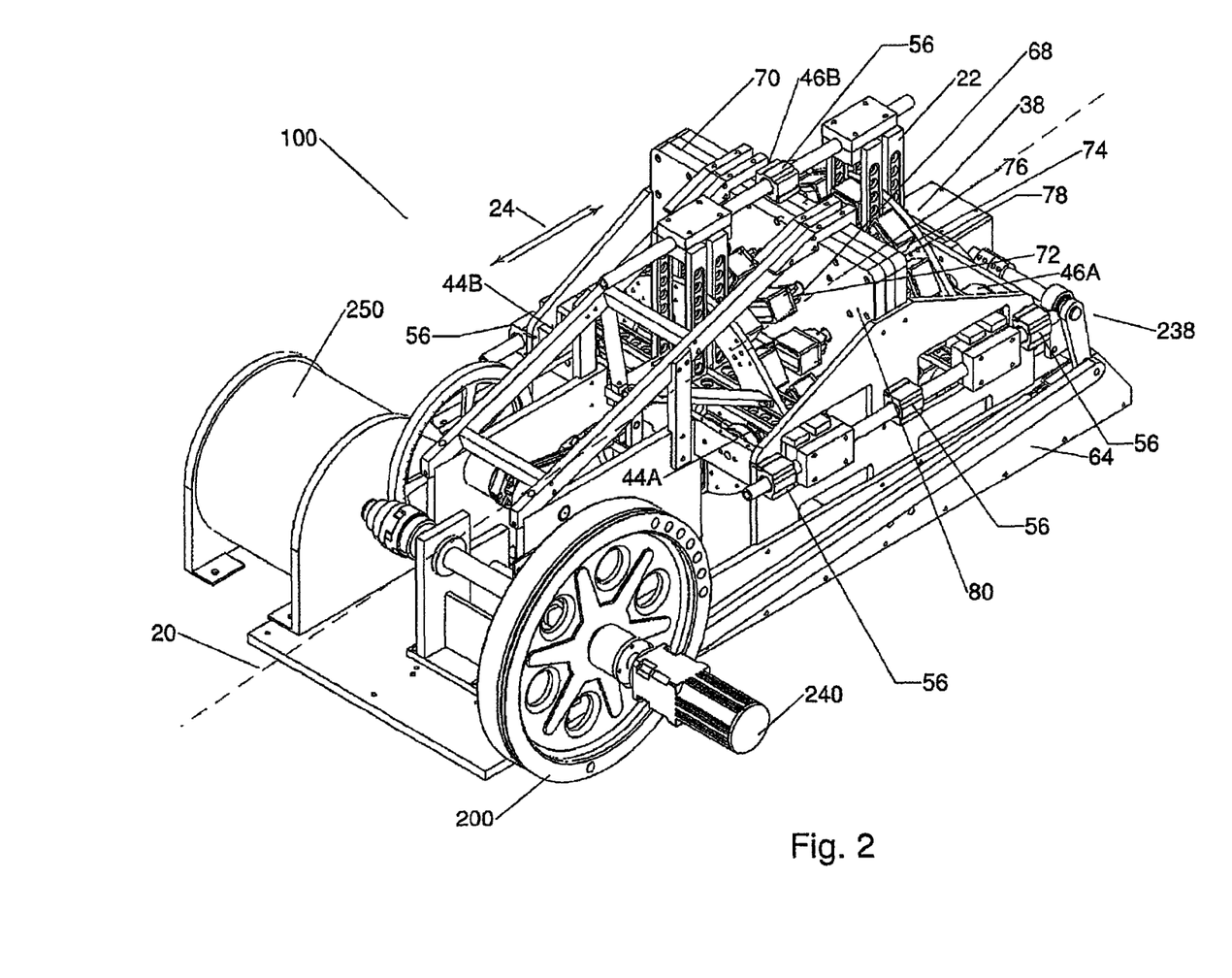
FIG. 2 is a perspective view of a multi axis embodiment of the invention.

The apparatus 100 is herein described as including a base 64 and the drive 38 affixed to the base. The drive 38 rotates a drive shaft 66 (see FIG. 2A) about its axis coincident with the axis 20. A plurality of rotatable auxiliary shafts 68 are carried by a bracket 70 affixed to the base 64. As herein described by way of example, twelve auxiliary shafts 68 are employed. Each of the auxiliary shafts has its ends 72, 74 extending through first and second sides 76, 78 of the bracket 70. A gear assembly 80 (see FIG. 2A) is operable between the drive shaft 66 and the auxiliary shafts 68 for rotation. A plurality of rotatable permanent magnets 12, 14 is attached to the plurality of auxiliary shafts 68. Each of the rotatable permanent magnets 12, 14 are carried at each of the ends 72, 74 of the auxiliary shafts 68 for rotation by their respective auxiliary shafts 68.

Figure 2A:
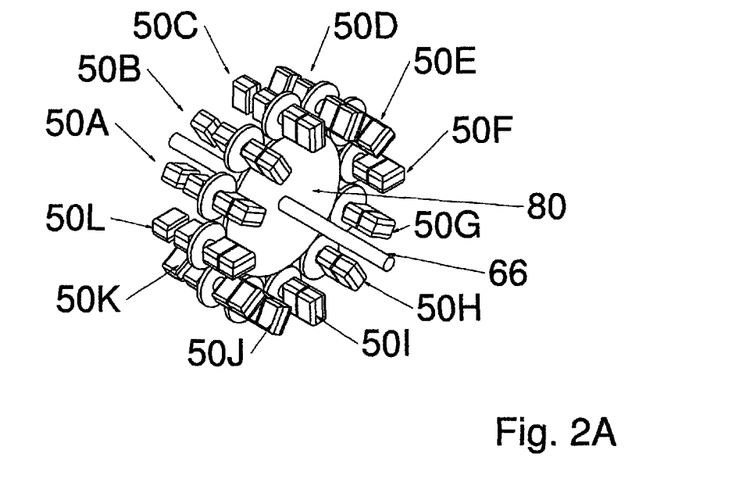
FIG. 2A is a partial perspective view of the ordered pairs of rotational and fixed permanent magnets of the apparatus of FIG. 2, with the bracket removed to show internal details.
Figure 2B:
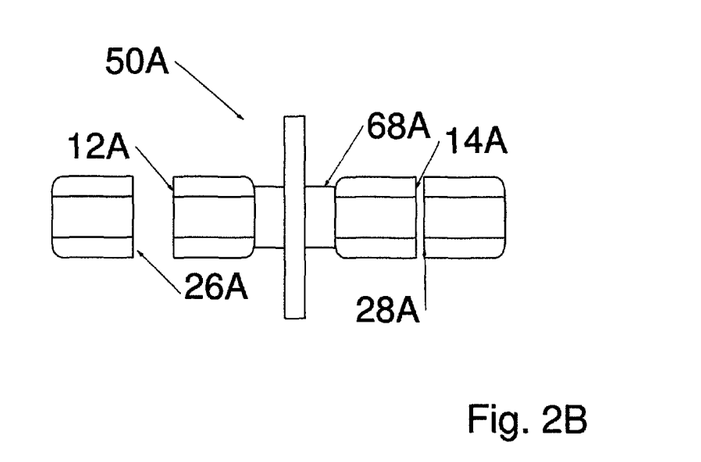
FIG. 2B is a top view of an exemplary set of the ordered pairs of rotational and fixed permanent magnets of FIG. 2A.

Turning to FIGS. 2A and 2B, the plurality of rotatable magnets 12, 14 located on the auxiliary shafts 68, coincident with the plurality of fixed permanent magnets 26, 28 are concentrically arranged with axis 20. The magnetic field of the fixed magnet 26A interacts with the magnetic field of rotatable magnet 12A, the magnetic field of the fixed magnet 28A interacts with the magnetic field of rotatable magnet 14A; forming permanent magnet axis group 50A. The magnetic field of the fixed magnet 26B interacts with the magnetic field of rotatable magnet 12B; the magnetic field of the fixed magnet 28B interacts with the magnetic field of rotatable magnet 14B, forming permanent magnet axis group 50B and the like for the balance of the magnets used in the apparatus 100. For efficiency of illustration, only group 50A is shown in FIG. 2B.

Returning to FIG. 2, The bearings 56 are attached to the base 64 and the shuttle 22 is slidably guided by the bearings for the linear movement 24 generally parallel to the axis 20. A plurality of fixed permanent magnets 26, 28 is affixed to the shuttle 22, wherein a fixed permanent magnet 26, 28 is positioned on the shuttle for interacting with a cooperating rotatable permanent magnet 12, 14 carried at the end of the auxiliary shafts 68.

The apparatus 100 further comprises first and second shock absorbers 44A, 44B, and 46A, 46B affixed to the base 64 on opposing sides of the bracket 70 with each of the shock absorbers operable for receiving an impact of the shuttle during the reciprocating movement 24 and each shock absorber absorbs an impact by overcoming an inertia provided by the shuttle and delivers a recoiling force to the shuttle 20.

Figure 3:
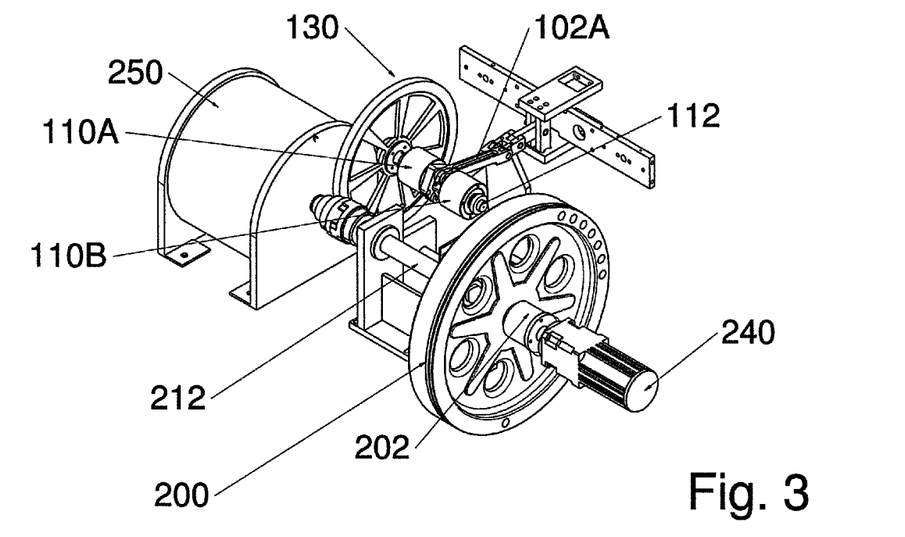
FIG. 3 is a partial enlarged perspective view illustrating the linear to rotary output apparatus of FIG. 2.

Refer to FIG. 3, a pair of opposite facing directional clutches 110A, 110B receive the force from the shuttle linear motion 24 thereby receiving power from the shuttle as it moves in each direction. The directional clutches 110A, 110B deliver the linear power received as input torque to the rotary shaft 112 that is connected through a gear system 130 to shaft 212 that supplies rotating torque to a rotary generator 250 and an energy storage fly wheel 200. The attachment of the shuttle 22 to the directional clutch 110A is by a bar link 102A, and the attachment of the shuttle 22 to the directional clutch 110B is by a bar link 102B (not shown). Each of the directional clutches 110A, 110B act over an arc to allow the shuttle to deliver its energy in an optimized method. In other embodiments mechanical devices such as rack and pinion gears may be used to deliver the linear power of the shuttle 22 to the pair of directional clutches 110A, 110B.

Figure 4:
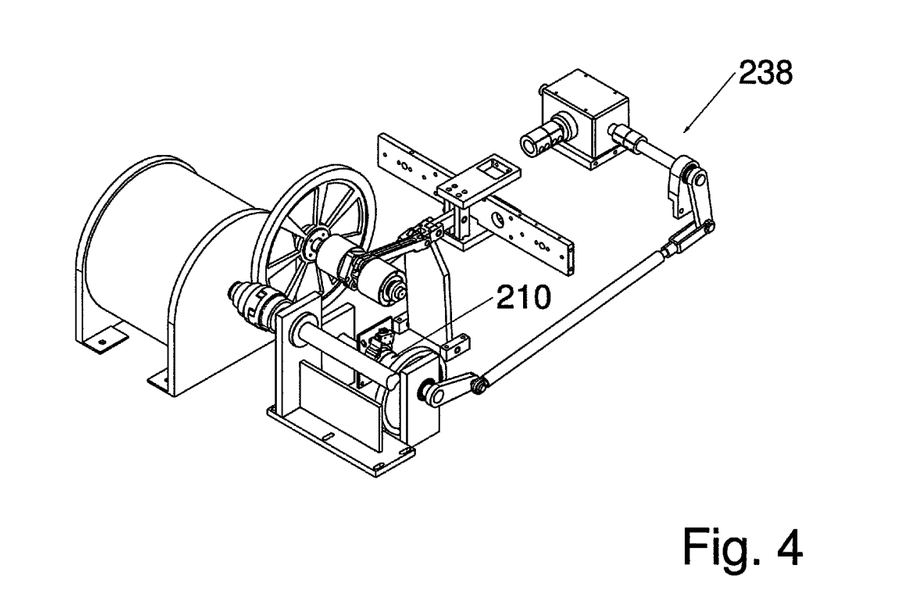
FIG. 4 is a partial enlarged perspective view illustrating the drive apparatus of FIG. 2.

The energy storage fly wheel 200 receives the cyclic impulse torque from shaft 212, storing the energy and providing a continuously available flow of energy for conversion through the rotary generator 250 and the drive system 238 as shown in FIG. 4. The rotary generator 250 provides a variable energy load to system 100 allowing energy to be directed for desired usage as well as to prevent undesirable acceleration of the shuttle 22.

Returning to FIG. 2, improved efficiencies of system 100 are realized for embodiments operating with the use of cyclic drive motion. The cyclic drive input is not directly coupled to the linear motion 24 of the shuttle 22. They are related by a function of the shuttle position, the load of the shuttle, and the point of engagement of the cyclic drive input to the plurality of rotating magnets 12,14.

As illustrated with reference to FIG. 5 the magnetic fields of the permanent magnets 12, 14, 26, 28 are focused in a desired direction by a magnetic focusing shoe 86 placed onto each of the poles of the permanent magnets 12, 14, 26, 28. The magnetic focusing shoes 86 are oriented to increase the magnetic flux between permanent magnet pairs 12, 26 and 14, 28. The magnetic focusing shoes 86 are made of a magnetic material such as steel and contoured to increase the magnetic flux direction 87 (shown as an arrow). The installation of magnetic focusing shoes 86 has increased the force between the permanent magnets 12, 14, 26, 28 by more than 300%. The use of rotating magnets as herein described has resulted in a prolonged magnetic strength for all the permanent magnets.

Figure 6:
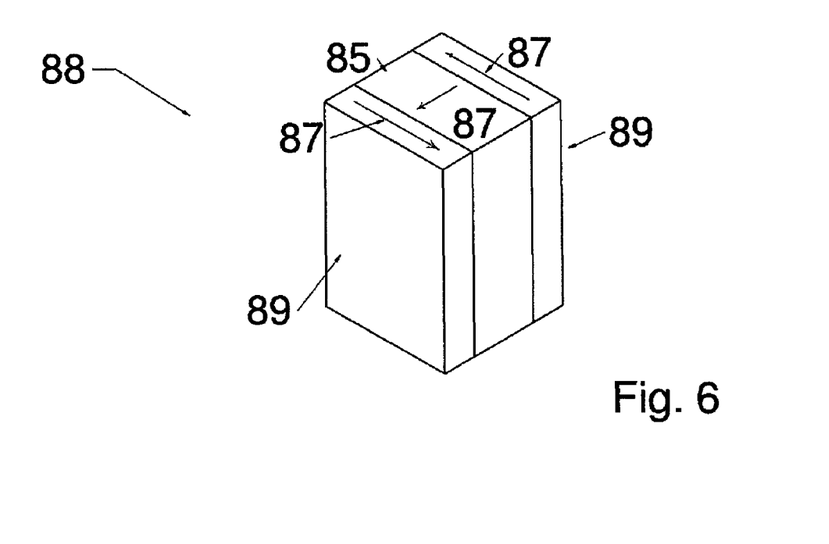
FIG. 6 is a perspective view of a set of permanent magnets in a Halbach array.

Referring to FIG. 6, additional strength can be achieved between the permanent magnet pairs by using permanent magnets in a Halbach array 88. Permanent magnets 84, 85, 89 are aligned where each magnets North orientation shown by arrow 87. The Halbach configuration will increase the concentration of the magnetic field in the desired direction while minimizing the magnetic field in all other directions.

Figure 5:
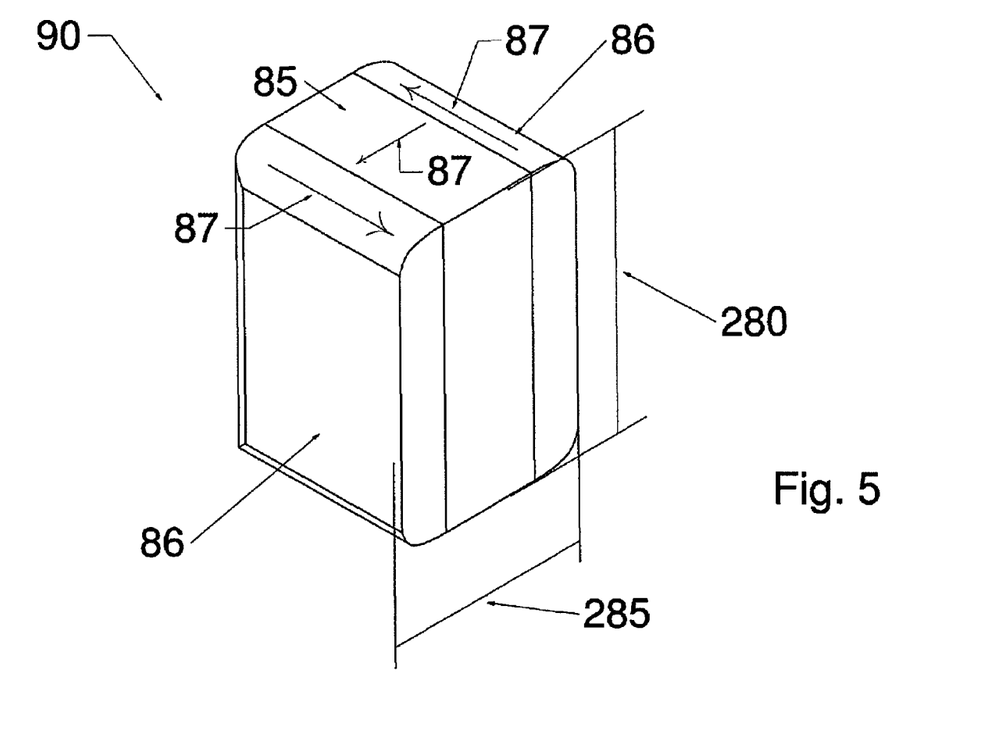
FIG. 5 is a perspective view of a permanent magnet with shaped focusing plates.
Figure 7:
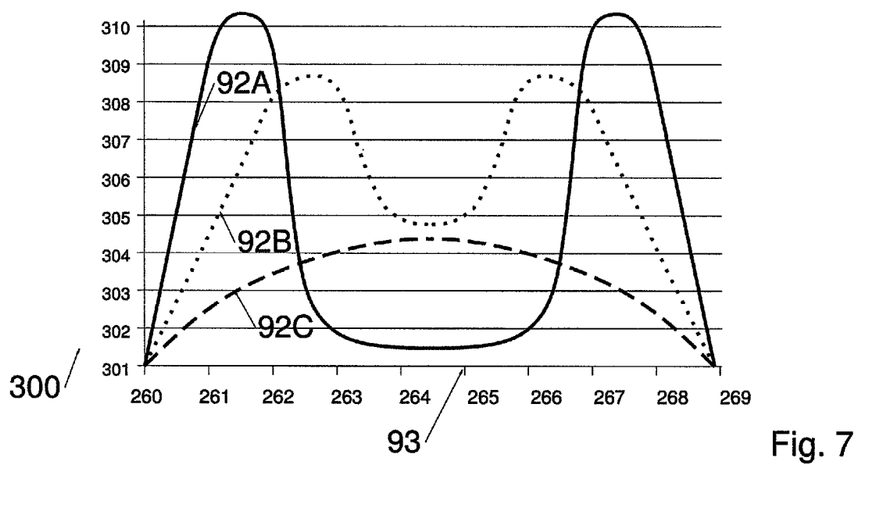
FIG. 7 is a graph of the torque of rotation versus aspect ratio of an ordered pair of rotational and fixed permanent magnets of the apparatus of FIG. 2.

Turing to FIGS. 5 and 7, the torque 300 required to rotate the rotatable permanent magnets 12, 14 when in the magnetic field of fixed permanent magnets 26, 28 varies with the aspect ratio 92 of the permanent magnets and the distance 93 between the magnets. Aspect ratio 92 is defined as the height of the permanent magnet 280 divided by the distance between the outermost sides 285 of the focused permanent magnet 90.

Continuing with FIG. 7, the curves of the graph show that for a set distance between magnets of equal strength, a high aspect ratio magnet 92A requires a higher peak torque for rotation, but provides a reduced torque passing through ninety degrees of rotation 265. The torque reduction is a result of the increase in the angular air gap 290 (not shown) between the fixed and the rotating magnets reducing their magnetic coupling. A permanent magnet set with square aspect ratio 92C has a lower torque that peaks as the magnet rotates through ninety degrees 265.

Figure 8:
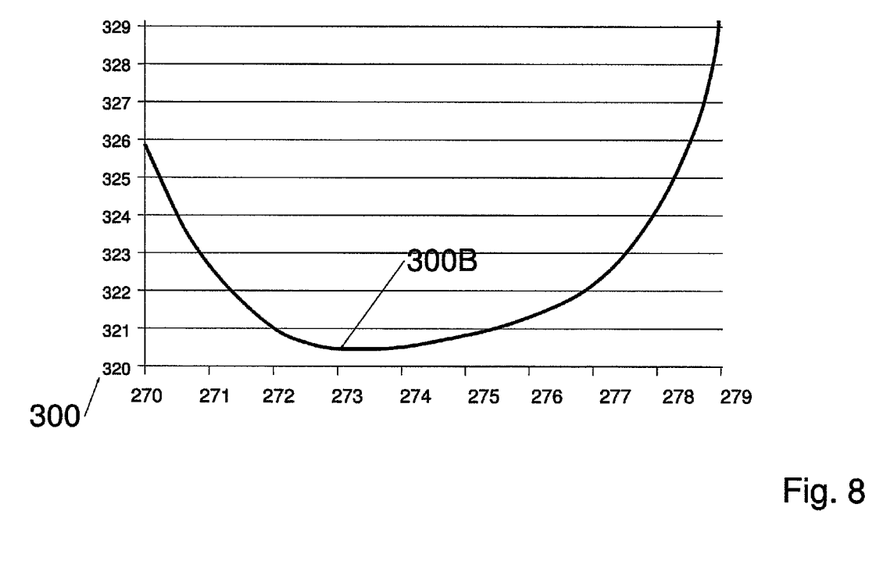
FIG. 8 is a graph of the torque of rotation versus the position of the shuttle of the apparatus of FIG. 2.

The peak torque required for rotation of a given aspect ratio 92 is at its lowest value as the distance between the magnets 12, 26 and 14, 28 are approximately equal. This should be near the center of the shuttle 22 motion 24. Referring to FIG. 8, the curve of torque 300 shows that this minimum torque 300B is offset from the center point 275 due to the difference in the attract versus the repel forces of the magnets 12, 26 and 14, 28. This offset will cycle to opposing sides of the center point 275 as the rotatable magnets rotate and change the direction of attract and repel of the permanent magnet axis groups 50.

The input torque required to rotate the rotatable permanent magnets is minimized by the use of high aspect ratio magnets and initiating the cyclic drive to begin rotation as the shuttle passes near the center point of the shuttle 22 motion 24. The cyclic drive input control is a position based function where a variable start command is needed for optimization. In the current embodiment, this control function is supplied by a programmable controller receiving a signal of the position of the shuttle. The programmable controller commands the clutch of drive 238 to initiate a rotation cycle and deliver torque 300 from flywheel 200 to the shaft 66. One skilled in the art will understand that a mechanical control system using cams and rate sensors may be used to provide the desired control. In other embodiments a servo drive system provides the cyclic drive input to rotate the rotatable permanent magnets.

A motor 240 is affixed to the base 64 and provides torque through overrunning clutch 202 for establishing rotation of the energy storage device 200 during start up of the system 100 and may provide additional energy to the system 100 for continuous operation. Rotary generator 250 is operable with the shuttle 22 for generating electrical power resulting from the linear movement 24 of the shuttle when the cyclic drive 238 is being cycled and the motor 240 when it is delivering torque 300 to shaft 212 through overrunning clutch 202.

When using the electric motor 240, it is appropriate to measure the electrical power output 60 from the rotary generator 250 and compare it to the electrical power input 62 of the electric motor as a measure of efficiency for the apparatus 100 when the cyclic drive 238 input is being cycled. When the cyclic drive 238 input is not being cycled; it is appropriate to measure the electrical power output 60 from the rotary generator 250 and compare it to the electrical power input 62 of the electric motor as measure of efficiency of the generator 250.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An apparatus comprising:
    a frame;
    a shuttle carried by the frame;
    a rotatable permanent magnet carried by the frame and having a north pole and an opposing south pole aligned with a plane, the rotatable permanent magnet rotatable about an axis within the plane and between the opposing poles;
    means confining the shuttle to a linear reciprocating movement generally parallel to the axis;
    first and second fixed permanent magnets fitted to the shuttle with the rotatable permanent magnet positioned between the first and second fixed permanent magnets, and with each of the first and second fixed permanent magnets having a north pole and an opposing south pole with an axis extending therebetween; and wherein
    the fixed permanent magnets are positioned on the shuttle such that rotation of the rotatable permanent magnet is coincident with a repelling force and an attracting force of the first and second fixed permanent magnets to effectuate the linear reciprocating movement of the shuttle.

2. The apparatus according to claim 1, further comprising a drive operable with the rotatable permanent magnet for providing a rotation thereto about the axis thereof.

3. The apparatus according to claim 2, where the drive provides a cyclic input motion.

4. The apparatus according to claim 3, where cyclic input motion is based on the shuttle position.

5. The apparatus according to claim 3, where the input motion is less than 360 degrees.

6. The apparatus according to claim 3, where the input motion is bi-directional.

7. The apparatus according to claim 1, further comprising first and second shock absorbers affixed on opposing sides of the shuttle and each operable for receiving an impact of the shuttle during the reciprocating movement thereof, wherein each of the first and second shock absorbers operates with the shuttle for overcoming an inertia provided thereby and for delivering a recoiling force thereto.

8. The apparatus according to claim 1, further comprising a linear to rotary converter for bidirectional capturing of the linear motion.

9. The apparatus of claim 8, where the linear to rotary converter provides a progressive variable rate.

10. The apparatus of claim 1, further comprising an energy storage device.

11. The apparatus of claim 8, further comprising a rotary generator for generating electrical power.

12. The apparatus of claim 8, further comprising a fly wheel as an energy storage device.

13. The apparatus according to claim 1, wherein opposing faces of the rotatable and fixed permanent magnets are in a spaced relation during reciprocating movement of the shuttle, and wherein a gap formed thereby has a dimension ranging from 0.045 inches at a first extreme position of the shuttle to 1.5 inches at a second opposing extreme position during the reciprocating movement.

14. The apparatus according to claim 1, further comprising a guide slidably receiving the shuttle for maintaining an alignment of the linear movement parallel to the axis of the drive shaft.

15. The apparatus according to claim 1, wherein the poles of the first fixed permanent magnet are 180 degrees out of phase with the poles of the second fixed permanent magnet.

16. An apparatus comprising:
    a drive operable for rotating a first shaft about a first axis thereof;
    a plurality of second shafts, each rotatable about a respective second axis;
    a coupling operable between the first shaft and the plurality of second shafts for rotation thereof each about their respective second axis;
    a plurality of rotatable permanent magnets operable with the plurality of second shafts, wherein each of the rotatable permanent magnets is defined by a north pole and an opposing south pole, and wherein each of the rotatable permanent magnets is rotated by a respective one of the second shafts about its respective second axis extending between the north and south poles;
    a shuttle slidably carried for linear movement generally parallel to the first axis; and
    a plurality of fixed permanent magnets affixed to the shuttle,
        wherein opposing fixed permanent magnets are positioned on the shuttle for interacting with respective opposing rotatable permanent magnets carried by each of the second shafts,
        wherein each of the fixed permanent magnets is defined by a north pole and an opposing south pole,
        wherein the rotatable permanent magnets and the fixed permanent magnets are aligned along the respective second axes; and
        wherein rotation of each of the rotatable permanent magnets about their respective second axis results in a repelling and an attracting of the fixed permanent magnets affixed to the shuttle, thus providing a linear reciprocating movement to the shuttle.

17. The apparatus according to claim 16, further comprising a drive operable with the rotatable permanent magnet for providing a rotation thereto about the axis thereof.

18. The apparatus according to claim 17, where the drive provides a cyclic input motion.

19. The apparatus according to claim 18, where cyclic input motion is based on the shuttle position.

20. The apparatus according to claim 18, where the input motion is less than 360 degrees.

21. The apparatus according to claim 18, where the input motion is bi directional.

22. The apparatus according to claim 16, further comprising first and second shock absorbers affixed on opposing sides of the shuttle and each operable for receiving an impact of the shuttle during the reciprocating movement thereof, wherein each of the first and second shock absorbers operates with the shuttle for overcoming an inertia provided thereby and for delivering a recoiling force thereto.

23. The apparatus according to claim 16, further comprising a linear to rotary converter for bidirectional capturing of the linear motion.

24. The apparatus of claim 23, where the linear to rotary converter provides a progressive variable rate.

25. The apparatus of claim 23, further comprising a rotary generator for generating electrical power.

26. The apparatus of claim 16, further comprising an energy storage device.

27. The apparatus according to claim 16, wherein opposing faces of the rotatable and fixed permanent magnets are in a spaced relation during reciprocating movement of the shuttle, and wherein a gap formed thereby has a dimension ranging from 0.045 inches at a first extreme position of the shuttle to 1.5 inches at a second opposing extreme position during the reciprocating movement.

28. The apparatus according to claim 16, further comprising a guide slidably receiving the shuttle for maintaining an alignment of the linear movement parallel to the axis of the drive shaft.

29. The apparatus according to claim 16, wherein the poles of the first fixed permanent magnet are 180 degrees out of phase with the poles of the second fixed permanent magnet.

30. A method for converting magnetic energy into a linear reciprocating movement, comprising the steps of:

providing a frame;

mounting a shuttle to the frame and confining the shuttle to a linear reciprocating movement;

fitting a rotatable permanent magnet to the frame such that the rotatable permanent magnet rotates about an axis generally parallel to a direction of linear reciprocating movement of the shuttle;

fitting first and second fixed permanent magnets to the shuttle with the rotatable permanent magnet carried between the first and second fixed permanent magnets; and positioning the first and second fixed permanent magnets such that rotation of the rotatable permanent is coincident with a repelling force and an attracting force of the first and second fixed permanent magnets in order to effectuate the linear reciprocating movement of the shuttle.

* * * * *